April 19, 1960     A. J. DE MOUDE     2,933,334
SELF-SEALING PIPE COUPLING
Filed Jan. 18, 1956
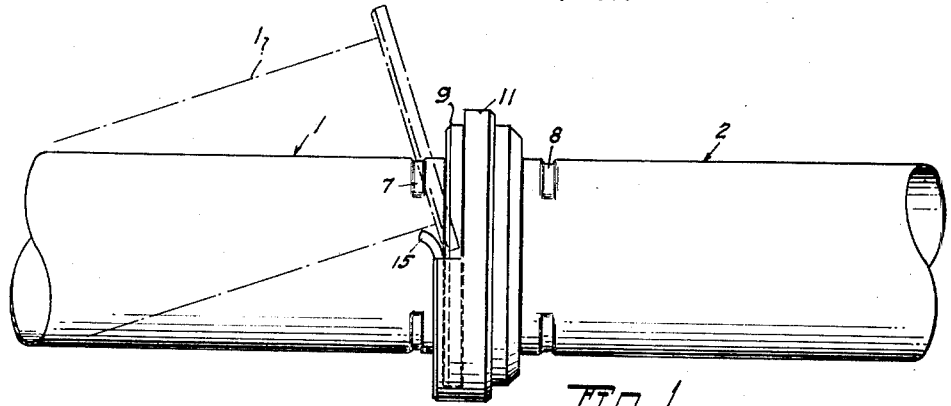
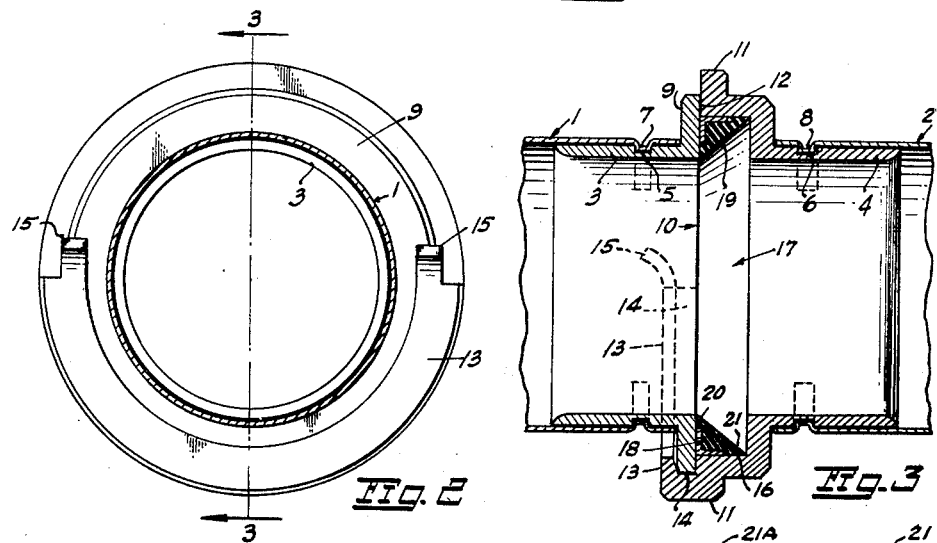
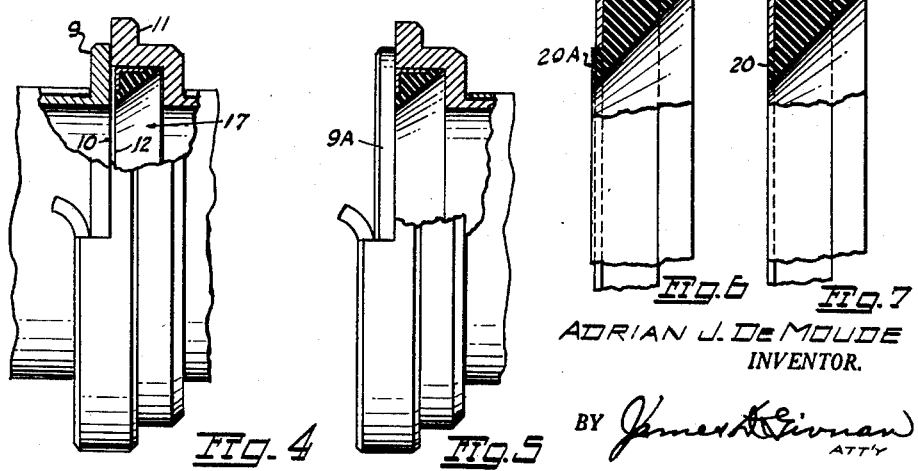
ADRIAN J. DeMOUDE
INVENTOR.
BY *James H. Girman*
ATT'Y

United States Patent Office 2,933,334
Patented Apr. 19, 1960

2,933,334

SELF-SEALING PIPE COUPLING

Adrian J. De Moude, Beaverton, Oreg.

Application January 18, 1956, Serial No. 559,913

1 Claim. (Cl. 285—110)

This invention relates to improvements in pipe couplings generally and more particularly to separable and connectible couplings for quickly and conveniently joining the ends of pipe sections as employed, for example, in portable irrigation equipment.

One of the principal objects of my invention is to provide a coupling for sections of pipe, hose or similar tubular elements which is of simple, efficient, durable, and economical construction involving a minimum number of parts and which is automatically instantaneous and positive in its action.

Another object of the invention is the provision of means between the coupling elements which is self-sealing under fluid pressure and self-draining in the absence thereof.

The foregoing and other obects will appear as my invention is more fully hereinafter described in the following specification, illustrated in the accompanying drawing, and finally pointed out in the appended claim.

In the accompanying drawing:

Figure 1 is a side view of a pipe coupling in conformity with the invention.

Figure 2 is a view, on a slightly enlarged scale, of the left-hand end of Figure 1.

Figure 3 is a sectional view taken along the line 3—3 of Figure 2.

Figure 4 is a fragmentary sectional view illustrating one form of flexible sealing gasket.

Figure 5 is a view similar to Figure 4 showing a flexible gasket applied to one of the coupling elements and to an end plate at the end of the last pipe section in a series.

Figure 6 is an enlarged sectional detail view of a modified form of flexible gasket.

Figure 7 is a similar view of the gasket shown in Figures 3 and 4.

Referring now more particularly to the drawing, in which like numerals indicate like parts, reference numeral 1 indicates the end of a pipe section to be coupled in sealed communication with the adjacent end 2 of an adjacent pipe section. The ends 1 and 2 of the adjacent pipe sections are provided with internal ferrules 3 and 4, respectively, each formed with diametrically opposed circumferentially spaced apart segmental grooves 5 and 6 into which the material of the respective pipe sections is crimped or depressed as indicated at 7 and 8 for permanently securing the ferrules to the ends of their respective pipe sections.

As best shown in Figure 3, the ferrule 3 is provided at its free end with an outer continuous annular perpendicular flange 9 having a flat front face 10. The ferrule 4 at its free end is provided with a similar flange 11 having a flat front face 12 for facial contact with face 10 of the flange 9. The lower half of the flange 11 is extended into a semicircular portion 13 internally channeled as at 14 to provide a socket for the corresponding flange portion 9 of the ferrule 3. The top end of each side of the semicircular portion 13 is provided witht upwardly and outwardly curved lugs 15 for convenience in dropping the flange 9 of the ferrule 3 into the socket groove of the ferrule 4. When so joined both ferrules and their respective pipe sections will have automatically come into axial alignment with each other with their respective flanges in stable facial contact with each other.

Extending inwardly from the face 12 of flange 11 is a continuous annular recess 16 of greater inside diameter than the inside diameter of the ferrule 3. Seated within the recess is a gasket, generally indicated at 17, comprising a metallic ring 18 of right angular shape in cross-section to the inner surface of both sides of which is bonded in any approved manner a ring 19 of flexible material such as rubber or the like of substantially triangular shape in cross-section.

The inner and outer peripheral edges of the ring 19 extend beyond those of the ring 18 to provide flexible rim portions 20 and 21. The outer peripheral edge of the ring 19 is of a greater diameter than that of the inner surface of the adjacent side of the ring 18 and the inner peripheral edge of the ring 19 is of lesser diameter than that of the corresponding edge of the adjacent side of the ring 18. By this arrangement the rim portions 20 and 21 are adapted to readily flex even under slight radial pressure into sealed engagement, respectively, with the face 10 of the flange 9 and the inside peripheral wall of the annular recess 16. Obviously the greater the pressure the more effective will the seal become. Regardless of the direction of flow of fluid through the coupling radial pressure will build up within the annular space between the inner wall of the recess 16 and the opposing tapered inner peripheral surface of the flexible ring 19. In the absence of pressure the flexible rim portions of the ring 19 will, of course, relax into their normal positions (see Figure 4) and thus allow fluid to drain from the pipe sections by escaping between the flat face of the flange 9, the adjacent surface of the gasket 17 and the face 12 of the flange 11. By this same arrangement all air in the pipe sections will be allowed to escape in advance of fluid entering the system.

In other systems such as gas or oil lines where any leakage would be wasteful and dangerous, I provide a permanent sealing gasket as shown in Figure 6 wherein the flexible rim portions 20A and 21A exceed the diameter and width of the supporting ring 18A so that the gasket will be securely held by a forced fit of the rim 21A within the annular recess 16 of the ferrule 4 and the rim 20A will be compressed against the flat face 10 of the flange 9 when the flange is positioned within the semicircular channel 14 of the ferrule 4. Here again the greater the compressive forces against the gasket the more effective will the seal become.

The coupling element at the end of the last pipe in a series (see Figure 5) can be closed by a disc 9A, supported in the same manner as the flange 9 of the ferrule 3. To provide a permanent leak-proof seal the gasket of Figure 6 is forced into the annular recess 16A of the coupling element. To provide a self-sealing and self-draining closure the gasket of Figure 7 is utilized.

While I have shown particular forms of embodiment of my invention I am aware that many minor changes therein will readily suggest themselves to others skilled in the art without departing from the spirit and scope of the invention. Having thus described my invention what I claim as new and desire to protect by Letters Patent is:

A pipe coupling comprising a pair of pipe sections to be coupled, interlocking coupling members secured to adjacent ends of the pipe sections for attaching the same together in axial alignment and adjacent ends of the coupling members in circumferential facial contact for confining fluid under pressure, each coupling member comprising an integrated external uninterrupted circumferential flange at its free end for facial abutment with the flange of the other, the free end of one of said coupling members having an annular recess extending inwardly therefrom, said recess being defined by a peripheral wall at right angles to an inner wall, a gasket disposed within said recess, said gasket comprising a rigid metallic ring of right angular shape in cross-section with one of its sides in frictional engagement with the peripheral wall of said recess, a ring of flexible material of triangular shape in cross-section bonded to the inside of said metallic ring having inner and outer rim portions, said outer rim portion having a greater outside diameter than the outside diameter of one of the sides of the metallic ring and projecting beyond said one side in an axial direction, said resilient ring having an inside diameter less than that of the corresponding edge of the other side of said metallic ring, whereby before assembly of the coupling members said gasket will be retained within said recess in sealing engagement therewith by radial pressure of said outer rim portion against the peripheral wall of the recess, and whereby when said coupling members are interlocked axial fluid pressure against said inner rim portion will provide an annular seal against said uninterrupted circumferential flange.

References Cited in the file of this patent

UNITED STATES PATENTS

| | | |
|---|---|---|
| 348,556 | Grueninger | Sept. 7, 1886 |
| 614,888 | Poetz | Nov. 29, 1898 |
| 712,775 | Dixon | Nov. 4, 1902 |
| 979,433 | Clay | Dec. 27, 1910 |
| 1,790,891 | Wright | Feb. 3, 1931 |
| 1,869,021 | Perks | July 26, 1932 |
| 2,250,199 | Kelly | July 22, 1941 |
| 2,301,097 | Tweedale | Nov. 3, 1942 |
| 2,709,092 | Wallace | May 24, 1955 |

FOREIGN PATENTS

| | | |
|---|---|---|
| 622,710 | France | Mar. 7, 1927 |